United States Patent
Rope et al.

(10) Patent No.: US 10,223,175 B2
(45) Date of Patent: *Mar. 5, 2019

(54) MODIFYING A DEVICE BASED ON AN ANNOTATED TIME SERIES OF SENSOR READINGS

(71) Applicant: International Business Machines Corporation, Armonk, NY (US)

(72) Inventors: Daniel J. Rope, Reston, VA (US); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,328

(22) Filed: Oct. 10, 2016

(65) Prior Publication Data

US 2018/0101419 A1    Apr. 12, 2018

(51) Int. Cl.
*G06F 9/54* (2006.01)
*G06F 9/48* (2006.01)

(52) U.S. Cl.
CPC ............ *G06F 9/542* (2013.01); *G06F 9/4887* (2013.01)

(58) Field of Classification Search
None
See application file for complete search history.

(56) References Cited

U.S. PATENT DOCUMENTS

| | | |
|---|---|---|
| 6,801,201 B2 | 10/2004 | Escher |
| 6,934,578 B2 | 8/2005 | Ramseth |
| 7,907,140 B2 | 3/2011 | Landau et al. |
| 8,631,392 B1 | 1/2014 | Owen et al. |
| 8,682,816 B2 | 3/2014 | Ruhl et al. |
| 2005/0114739 A1* | 5/2005 | Gupta ............ G06F 11/008 714/39 |
| 2006/0036542 A1 | 2/2006 | McNair |
| 2008/0033991 A1* | 2/2008 | Basak ............ G06F 11/3442 |
| 2014/0132627 A1 | 5/2014 | Pompey et al. |
| 2014/0133766 A1 | 5/2014 | Das et al. |
| 2014/0136454 A1 | 5/2014 | Hirade |
| 2015/0019513 A1 | 1/2015 | Dey et al. |

(Continued)

OTHER PUBLICATIONS

List of IBM Patents and Patent Applications Treated as Related, Oct. 30, 2017.

(Continued)

*Primary Examiner* — Syed A Roni
(74) *Attorney, Agent, or Firm* — Law Office of Jim Boice

(57) ABSTRACT

A method, system, and/or computer program product modify a hardware device based on a time series of data. One or more processors standardize a time series of data received from sensors that are monitoring a hardware device. The processor(s) determine a time delta that measures how long a disruption in the time series lingers after an event that is detected by the sensors, and use the time delta to establish time ranges before, during and after each event. The processor(s) determine which events represented by the time series of data are significant, and then reduce a number of significant events described by the time series of data to a predefined level by removing events that have tags not found associated with other events in the time series of data to generate a modified time series of data, which is used to modify the hardware device.

19 Claims, 6 Drawing Sheets

(56) References Cited

U.S. PATENT DOCUMENTS

2015/0066966 A1 3/2015 O'Donnell et al.
2015/0205693 A1 7/2015 Seto
2015/0242384 A1 8/2015 Reiter
2017/0308801 A1* 10/2017 Cai ..................... G06N 99/005

OTHER PUBLICATIONS

P. Mell et al., "The Nist Definition of Cloud Computing", National Institute of Standards and Technology, Information Technology Laboratory, Sep. 2011, pp. 1-7.

Qu et al., "A Novel Method for Time Serises Symbolization Based on Singular Event Features Clustering", Future Computer and Communication (ICFCC), 2010 2nd International Conference on, vol. 1, May 21-24, 2010, pp. V1-143-V1-146.

Hullman et al., "Contextifier: Automatic Generation of Annotated Stock Visualizations", CHI'13 Proceedings of the SIGCHI Conference on Human Factors in Computing Systems, Apr. 27-May 2, 2013, pp. 2707-2716.

* cited by examiner

MODIFYING A DEVICE BASED ON AN ANNOTATED TIME SERIES OF SENSOR READINGS

BACKGROUND

The present disclosure relates to the field of hardware devices, and specifically to hardware devices that include at least one operational sensor. More specifically, the present disclosure relates to modifying hardware devices based on an annotated time series of sensor readings from the operational sensor.

SUMMARY

A method improves a functionality of a hardware device based on results of a time series analysis. One or more processors receive multiple sets of sensor readings, where each of the multiple sets of sensor readings describes an event in a hardware device. The processor(s) plot sensor readings for the plurality of events onto multiple time series data graphs, where each of the multiple time series data graphs is specific for a particular event in the hardware device. The processor(s) transform the multiple time series data graphs into multiple modified time series data graphs, where one or more processors transform each of the multiple time series data graphs into a unique modified time series data graph by: de-trending each time series data graph by fitting a simple statistical trend model such as linear regression, spline or a LOESS smoother and subtracting that fitted trend from the original data; determining a unique time-distance decay time D for each time series data graph, where a time-distance decay time D describes a time at which an event no longer affects a time series data graph beyond a predefined limit; smoothing each time series data graph using a time series smoother; and defining a time span around each said different event, where the time span extends from a start event time e1 to an end event time e2, and where the time span is from e1−D to e2+D. The processor(s) calculate a mean value and a trend value for time spans in the multiple modified time series data graphs, and then determine whether the mean value and the trend value for the time spans in the multiple modified time series data graphs exceed a statistical limit. In response to determining that the mean value and the trend value for the time spans in the multiple modified time series data graphs do not exceed a statistical limit, the processor(s) identify the events from the multiple modified time series data graphs as candidate events. The processor(s) then identify the candidate events that share more than a predefined quantity of shared features as events having a common feature, and then modify the hardware device in order to mitigate the common feature from the hardware device.

This embodiment may also be implemented in a computer program product and/or a computer system.

In an embodiment of the present invention, a method, system, and/or computer program product modify a hardware device based on a time series of data. One or more processors standardize a time series of data received from sensors that are monitoring a hardware device. The processor(s) determine a time delta that measures how long a disruption in the time series lingers after an event that is detected by the sensors, and then use the time delta to establish time ranges before, during and after each event. The processor(s) determine which events represented by the time series of data are significant by comparing means and trends of time sub-series corresponding to the time ranges before, during and after each event, and then reduce a number of significant events described by the time series of data to a predefined level by removing events that have tags not found associated with other events in the time series of data to generate a modified time series of data. The processors(s) modify the hardware device based on the modified time series of data.

DETAILED DESCRIPTION

Figure 1:
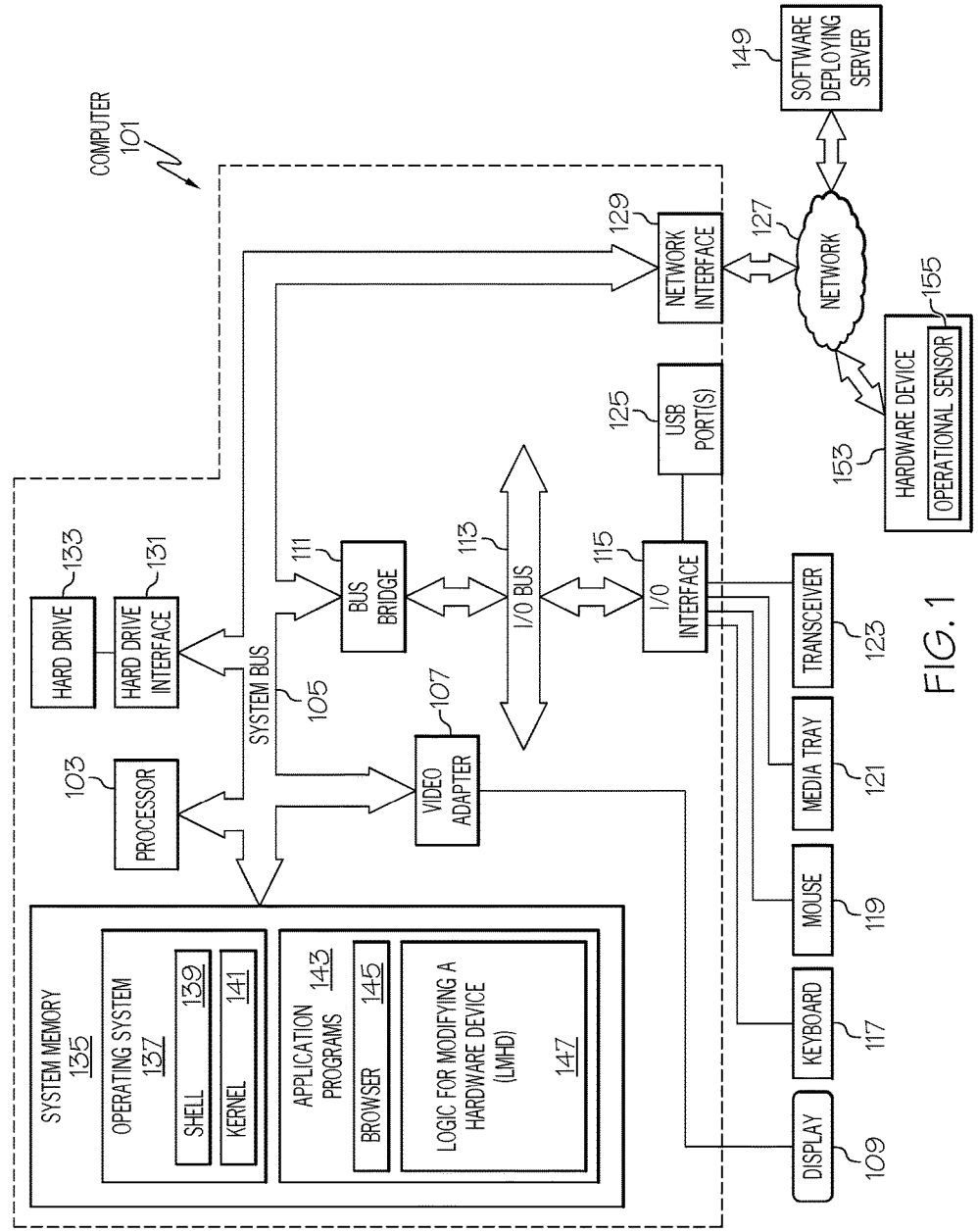
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or hardware device 153 shown in FIG. 1 and/or the managing computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

In an embodiment of the present invention, computer 101 is able to communicate via network 127 to a hardware device 153 and/or an operational sensor 155 within or associated with hardware device 153. In one or more embodiments, hardware device 153 is a physical device capable of performing a physical operation, such as assembling a product (e.g., a robot), shaping material (e.g., a computer numeric control—CNC lathe), an actuator-controlled valve in a petrochemical plant, etc. In one or more embodiments, hardware device 153 is a software resource server, which is capable of serving (supplying) applications, databases, electronic files (e.g., text files, video files, audio files, etc.), virtual machines, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Modifying a Hardware Device (LMHD) 147. LMHD 147 includes code for implementing the processes described below, including those described in FIGS. 2-4. In one embodiment, computer 101 is able to download LMHD 147 from software deploying server 149, including in an on-demand basis, wherein the code in LMHD 147 is not downloaded until needed for execution. In one embodiment of the present invention, software deploying server 149 performs all of the functions associated with the present invention (including execution of LMHD 147), thus freeing computer 101 from having to use its own internal computing resources to execute LMHD 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
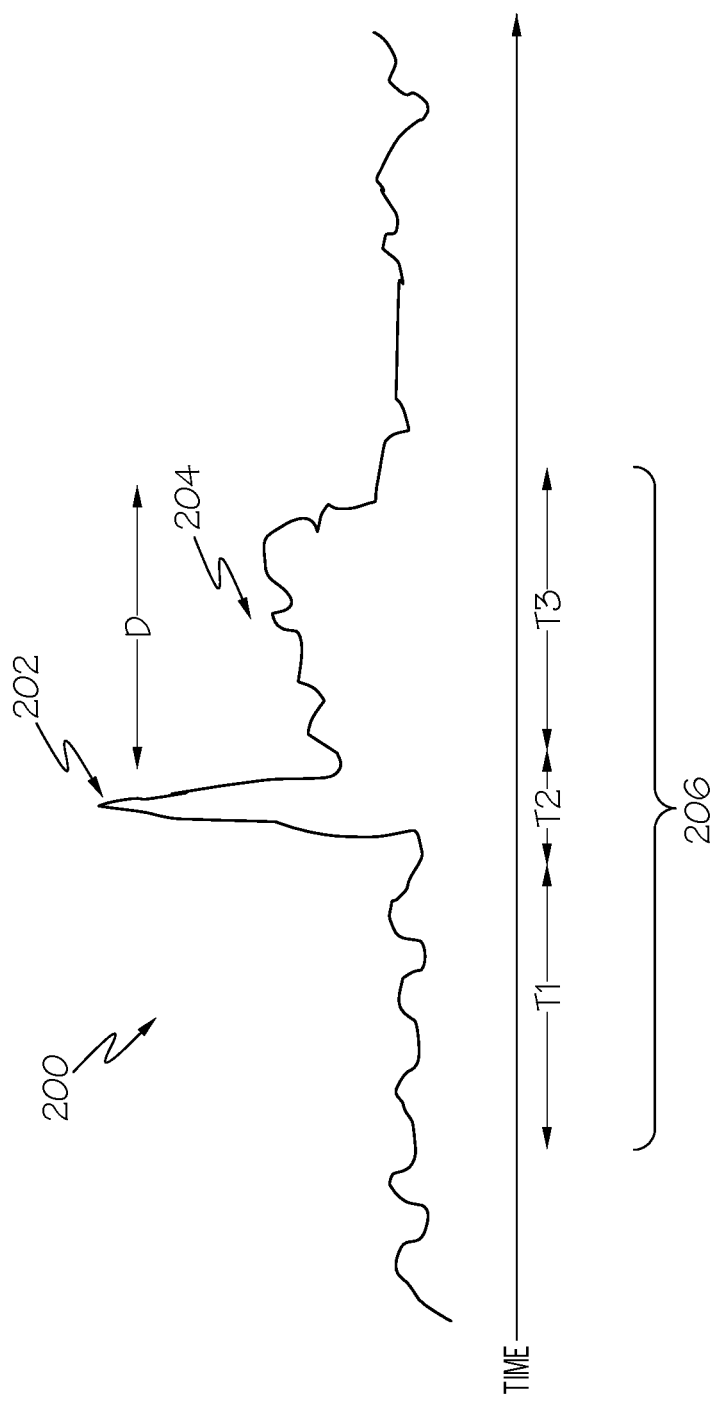
FIG. 2 illustrates an exemplary modified time series data graph as utilized in one or more embodiments of the present invention.

With reference now to FIG. 2, a time series data graph 200 used in one or more embodiments as the basis for modifying a hardware device (e.g., hardware device 153 shown in FIG. 1) is presented.

Time series data consists of one or more values measured over time, and may be utilized in various industries. Time series data can be examined in order to find out when and why certain changes occur—for example, why there is a spike in the data at a certain time.

The time series data graph 200 is modified into a modified time series data graph (also referred to as an annotated time series data graph) in order to provide useful information for identifying problems in a device and correcting them. Thus, as described herein the present invention presents a method, system, and/or computer program product for automatically annotating/modifying time series data in order to 1) discover insights into what might have affected measures of interest; and 2) modify a hardware device that is affected by events represented by the time series data.

That is, one or more embodiments of the present invention automatically annotates a time series of data using a pre-defined set of significant events by: standardizing the time series; determining a time delta that measures how long a disruption in the time series lingers; using that time delta to establish time ranges before, during and after each event; determining which events are significant by comparing the means and trends of the sub-series corresponding to multiple time ranges in time series of data defined herein; and reducing the number of significant events to a usable number by removing events that have unusual tags relative to the other events found. Based on these findings/analysis, the present invention then adjusts/modifies a hardware device that caused and/or is affected by events found in the final time series data graph.

Thus, the present invention starts with an initial set of time series data graphs, each of which depict an event within a device. The initial set of time series data graphs are then modified in the following manner.

First, the initial set of time series data graphs are de-trended, by fitting a standard statistical trend model such as a linear regression, spline, or LOESS trend model and subtracting the fitted trend values for each time point from the actual data value at that time point.

Second, a time series analysis is performed to determine a suitable time-distance parameter, known as a time-distance decay parameter D. This distance parameter can be thought of as the time it takes for an effect of an event that occurred at time T to be negligible at time T+D. That is, in FIG. 2 an event 202 occurred during time T2. Event 202 affected the time series data graph during the decay time-distance D (depicted as element 204 and T3).

For example, assume that the time series data graph event 202 is a graph of pressure sensor readings from within a pipeline, showing a sudden spike in pressure in a pipeline. As shown in FIG. 2, before this spike in pipeline pressure (i.e., during time T1, which is equal to the decay time-distance D−T3), the pipeline pressure was low/nominal. However, the pipeline pressure spike at time T2 resulted in a residual pressure increase during time T3. As shown in FIG. 2, after time T3 the pressure in the pipeline returned to the low/nominal level.

In another example, assume that the time series data graph event 202 is a graph of instructions per second (IPS) being executed by a processor, as detected by a processor monitor. As shown in FIG. 2, before this spike in IPSes (i.e., during time T1), the processor was operating normally. However, the IPS spike during time T2 resulted in a residual IPS increase during time T3. As shown in FIG. 2, after time T3 the IPS rate in the processor returned to the low/nominal level.

In another example, assume that the time series data graph event 202 is a graph of data transfer rate (DTR) for data being written to and/or read to a digital storage device, as detected by a storage controller. As shown in FIG. 2, before this spike in DTRs (i.e., during time T1), the storage was being utilized normally. However, the DTR spike during time T2 resulted in a residual DTR increase during time T3. However, after time T3, the DTR rate for the digital storage device returned to the low/nominal level.

In one or more embodiments of the present invention, in order to determine the decay time-distance D described above, an autoregressive integrated moving average (ARIMA) model may be applied to the time series data graph 200. Fitting an ARIMA(0,1,1) model will give a moving average MA(1) coefficient that measures the decay of an effect, and so the distance D (i.e., the decay time-distance D) can be established.

Returning now to the process of modifying the initial set of time series data graphs, the third step involves smoothing the data in the time series data graph 200 by using a smoothing algorithm that retains an overall pattern for the data while removing any noise (extraneous information) from the data.

In order to smooth the time series data graph 200, the MA(1) coefficient (described above) can also be used for single exponential smoothing, for example. That is, the decay time-distance D is also the basis for smoothing the time series data graph 200, since the MA(1) can also be used to establish what portion of the time series data graph 200 (i.e., that during time T3) is smoothed out.

When analyzing the timer series, the following Fourth, Fifth, Sixth, and Seventh steps described below are taken for each event depicted in the time series data graph 200.

Thus, the Fourth step is to determine if the event being depicted in the time series data graph 200 does not have an end point (i.e., time T2 extends to the far right of the time series data graph 200. If so, then the end point is taken to be the same as the start point. Otherwise, the start time for the event is termed e1 and the end time for the event is termed e2.

The Fifth step divides the time range for the data into three parts, shown in FIG. 2 as T1, T2, and T3, where:

T1=[e1−D, e1]—before the event
T2=[e1, e2]—during the event
T3=[e2, e2+D]—after the event The Sixth step has the system calculating, for each non-empty time span, the mean value for each time span/period (Mean1, Mean2, Mean3) in different time series data graphs and the trend during those time spans/periods (Trend1, Trend2, Trend3).

The Seventh step has the system using any selected statistical technique to evaluate if there are significant differences between any of the means and/or any of the trends from the various time series data graphs.

When these seven steps are completed, the system has defined a list of candidate events. If there are many events (as determined automatically by the system, for example using a pre-set maximum number, e.g. five), then events are eliminated sequentially by removing the event that has the least commonality in tags with the other indicated events. For example, assume that the following five events (A-E) are found in a database, are depicted in time series data graphs, and are related to the subject/entities/topics shown to the right of each of the labeled events A-E:

A conflict, USA, UK
B USA
C conflict, Germany
D society
E celebrity, USA

Assume now that the system/user desires to evaluate only three events. The system will first eliminate event D, as it has no tag in common with any other event. This leaves only events A-C and E:

A conflict, USA, UK
B USA
C conflict, Germany
E celebrity, USA

As shown, event A has tags in common with all other three events B, C, and E; event B has tags in common with two events A and E; event C has one tag in common event A; and event E has tags in common with two events A and B. Since event C has the fewest common tags (only one common tag) with the other events (i.e., event A), then event C is eliminated, leaving:

A conflict, USA, UK
B USA
E celebrity, USA

Thus, events A, B, and E are the three candidate events that are most closely related, and thus are those of greatest interest when determining a common cause and/or effect of the three events.

Figure 3:
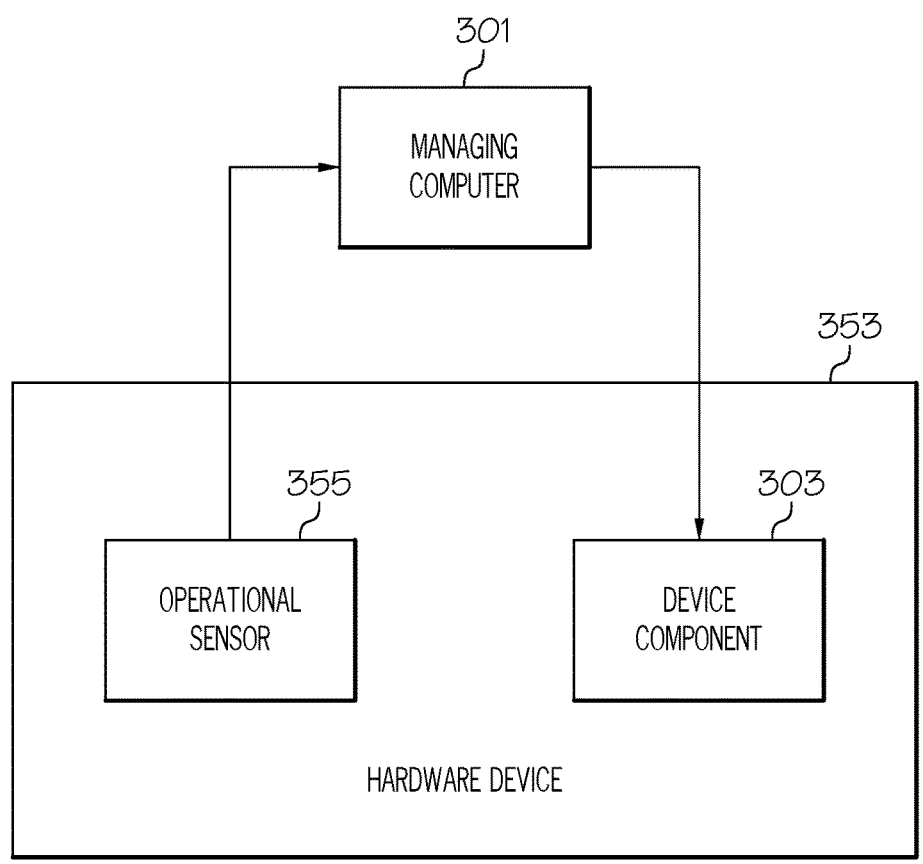
FIG. 3 depicts a hardware device being monitored and modified by a managing computer in accordance with one or more embodiments of the present invention.

When applying this approach to the monitoring and mediation of devices, consider now FIG. 3. As depicted, a managing computer 301 (analogous to computer 101 shown in FIG. 1) is monitoring an operational sensor 355 in a hardware device 353 (analogous to hardware device 153 shown in FIG. 1). Hardware device 353 is described above as a pipeline, a computer, or a storage device. However, hardware device 353 may be any other hardware device capable of being monitored and adjusted, such as (but not limited to) a manufacturing device (e.g., a robot) in a product manufacturing facility, a transportation vehicle (car, truck aircraft, etc.), a medical device (e.g., a CT scanner), a pressure vessel in a petrochemical plant, etc.

Assume now for explanatory purposes that hardware device 353 is a pressure vessel in a petrochemical plant. Assume that operational sensor 355 detects a spike in pressure in the pressure vessel, as depicted in the time series data graph 200 as event 202. This pressure spike causes a continued increase in pressure in the pressure vessel during the decay time-distance D (depicted as element 204 and time T3). In order to improve the operation of the pressure vessel (i.e., to reduce the recurrence of event 202 and the lingering after-effects depicted during time T3), the monitoring computer 301 shown in FIG. 3 will then adjust a pressure relief valve (i.e., device component 303) on the pressure vessel (hardware device 353), thus improving the safety of the pressure vessel.

This type of approach may be applied to any physical device that can be monitored and adjusted, in order to improve the functionality of that physical device, as well as any software that can be monitored and adjusted in order to improve the functionality of the computer on which that software is executing.

Figure 4:
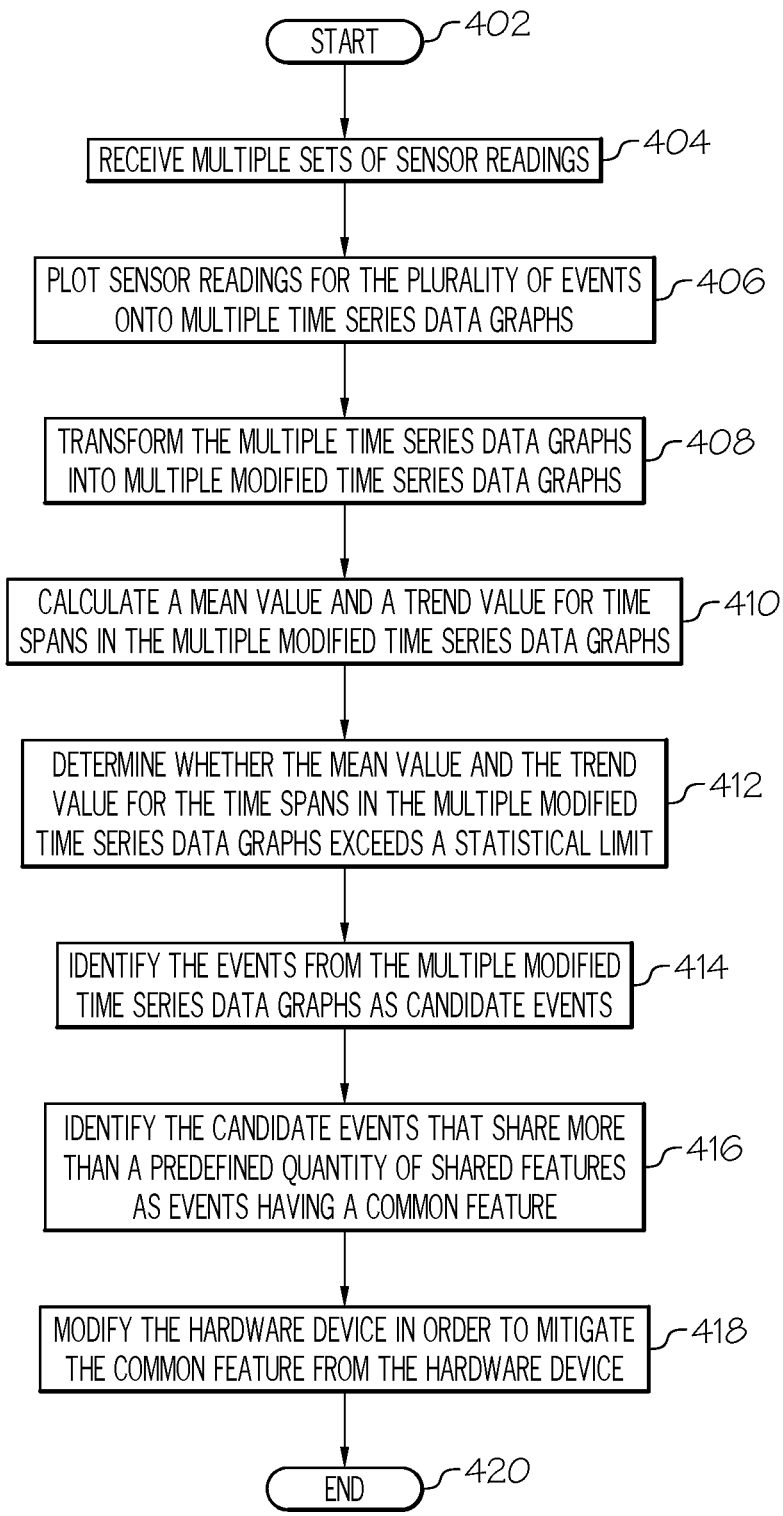
FIG. 4 is a high-level flow chart of one or more steps performed by one or more processors and/or other hardware devices to modify a hardware device in accordance with one or more embodiments of the present invention.

With reference now to FIG. 4, a high-level flow chart of one or more steps performed by one or more processors and/or other hardware devices to modify a hardware device in accordance with one or more embodiments of the present invention is presented.

After initiator block 402, one or more processors (e.g., within monitoring computer 301 shown in FIG. 3) receive multiple sets of sensor readings (e.g., from operational sensor 355 shown in FIG. 3) for a plurality of events in a hardware device, as described in block 404. The present invention affords a way to determine if two or more events are similar/related in their cause, in order to correct their underlying cause.

As described in block 406 of FIG. 4, the processor(s) then plot sensor readings for the plurality of events onto multiple time series data graphs (e.g., different graphs such as the time series data graph 200 shown in FIG. 2). Each of the multiple time series data graphs is specific for a particular event in the hardware device.

As described in block 408, the processor(s) then transform the multiple time series data graphs into multiple modified time series data graphs. This transformation is performed by the steps described above, and include transforming each of the multiple time series data graphs into a unique modified time series data graph by: de-trending each time series data graph by subtracting a standard statistical fitted trend model; determining a unique decay time-distance D for each time series data graph, where a decay time-distance D describes a time at which an event no longer affects a time series data graph beyond a predefined limit; smoothing each time series data graph using a time series smoother; and defining a time span around each said different event, where the time span extends from a start event time e1 to an end event time e2, and where the time span is from e1−D to e2+D.

As described in block 410, the processor(s) then calculate a mean value and a trend value for time spans in the multiple modified time series data graphs. That is, each evaluation time span 206 from all of the time series data graphs (depicting the different instances of the event) are compared to one another in order to determine if they have the same amount of decay/impact (D). Furthermore, these time spans are compared to see if they have the same trends (e.g., increasing in value, decreasing in value, having a stable value, etc.) during that time period.

For example, assume that a first time series data graph shows that the graph during the evaluation time span 206 shown in FIG. 2 depicts a mean pressure value in a pressure vessel during that evaluation time span 206 of 50 psi, and the overall trend in the pressure values in the pressure vessel increased by 20% during that evaluation time span 206. Assume further that a second time series data graph shows that the graph during the evaluation time span 206 shown in FIG. 2 depicts a mean pressure value in the same pressure vessel during another evaluation time span 206 of 45 psi, and the overall trend in the pressure values in the pressure vessel increased by 23% during that other evaluation time span 206.

Thus, as described in block 412 of FIG. 4, the processor(s) will then determine whether the mean value and the trend value for the time spans in the multiple modified time series data graphs exceeds a statistical limit (e.g., varies by more than 20%).

If not (block 414 in FIG. 4), then the processor(s) identify candidate events. That is, in response to determining that the mean value and the trend value for the time spans in the multiple modified time series data graphs do not exceed a statistical limit, then the processor(s) identify the events from the multiple modified time series data graphs as candidate events (in this example, various instances of pressure spikes in the pressure vessel).

As described in block 416, the processor(s) then identify the candidate events that share more than a predefined quantity of shared features as events having a common feature. For example, assume that the spike in the pressure vessel was caused by a same pump.

As described in block 418, the processor(s) will then modify that pressure vessel by eliminating the problem with that pump (i.e., either replacing the pump or modifying it).

The flow chart shown in FIG. 4 ends at terminator block 420.

Note that one or more of the graphs described above may be displayed on a computer monitor (e.g., display 109 shown in FIG. 1).

The present invention may be applied to modifying a computer. For example, assume that the common feature associated with different events found in the time series data graph is a slow processor on a board that also has a faster processor. As such, the system will switch from that slow processor to the faster processor, thereby solving the problem and improving the operations of the computer.

Similarly, the present invention may be applied to modifying a storage array. For example, assume that the common feature associated with different events found in the time series data graph is a slow access time associated with a first storage device in the storage array. As such, the system will switch from that slow first storage device to a faster second storage device in the storage array, thus solving the problem and improving the operations of the storage array.

As described herein, in one or more embodiments of the present invention the time-distance decay parameter D is derived by applying an autoregressive integrated moving average (ARIMA) algorithm to each time series data graph.

Similarly, in one or more embodiments of the present invention the time series smoother is derived by applying an autoregressive integrated moving average (ARIMA) algorithm to each time series data graph.

While the present invention has been described in detail with the use of a pressure vessel (e.g., within a petrochemical plan), in an embodiment of the present invention the hardware device being monitored and modified is a manufacturing device (e.g., a robot, a computer numeric control—CNC machining tool, etc.). For example, assume that a CNC machining tool has a bit chuck that uses a certain bit. Assume further that while using this bit, parts coming out of the CNC machine tool are shown to be within tolerance levels for 10 parts, but then an eleventh part is 100% out of tolerance (a spike), the next 3 parts are 50% out of tolerance (D as described above), and the next 7 parts are again within tolerance (post T3 as shown in FIG. 2). Assume that this pattern repeats itself, as shown in a subsequent time series data graph. This enables the system to 1) identify the common feature (that particular bit) that is causing the manufacturing device errors/variations (and thus introducing the defect into the product) in order to 2) remove that bit from the CNC machining tool.

In another embodiment of the present invention, the hardware device is a computer, and the common feature is a result of a hardware defect in the computer. That is, assume that a computer has a defective hard drive, which manifests itself as event spikes (e.g., data retrieval errors) across multiple time series data graphs, such as that shown in FIG. 2, and that recurs within the mean/trend boundaries described above. The monitoring computer 301 shown in FIG. 3 will correlate these spikes with that defective hard drive (e.g., if that hard drive is the only active storage device in the computer), and will electronically switch to a stand-by hard drive.

In another embodiment of the present invention, the hardware device is also a computer, but now the common feature is caused by a software defect in the computer. For example, assume that the monitoring computer 301 detects a spike in input/output (I/O) activities (event 202 in FIG. 2) that recurs within the mean/trend boundaries described above. As such, the monitoring computer 301 will perform the processes described in FIG. 4 to identify the recurring events, and will then identify the software responsible for the problem (e.g., firmware within a network interface card).

In another embodiment of the present invention, the hardware device is a storage device (e.g., a hard drive), and the common feature (e.g., faulty data retrieval operations) is caused by a defect in a controller of the storage device. For example, assume that the monitoring computer 301 detects a spike in faulty data retrieval operations from the hard drive (event 202 in FIG. 2) that recurs within the mean/trend boundaries described above. As such, the monitoring computer 301 will perform the processes described in FIG. 4 to identify the recurring events, and will then identify the data controller associated with the hard drive that is responsible for the problem.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
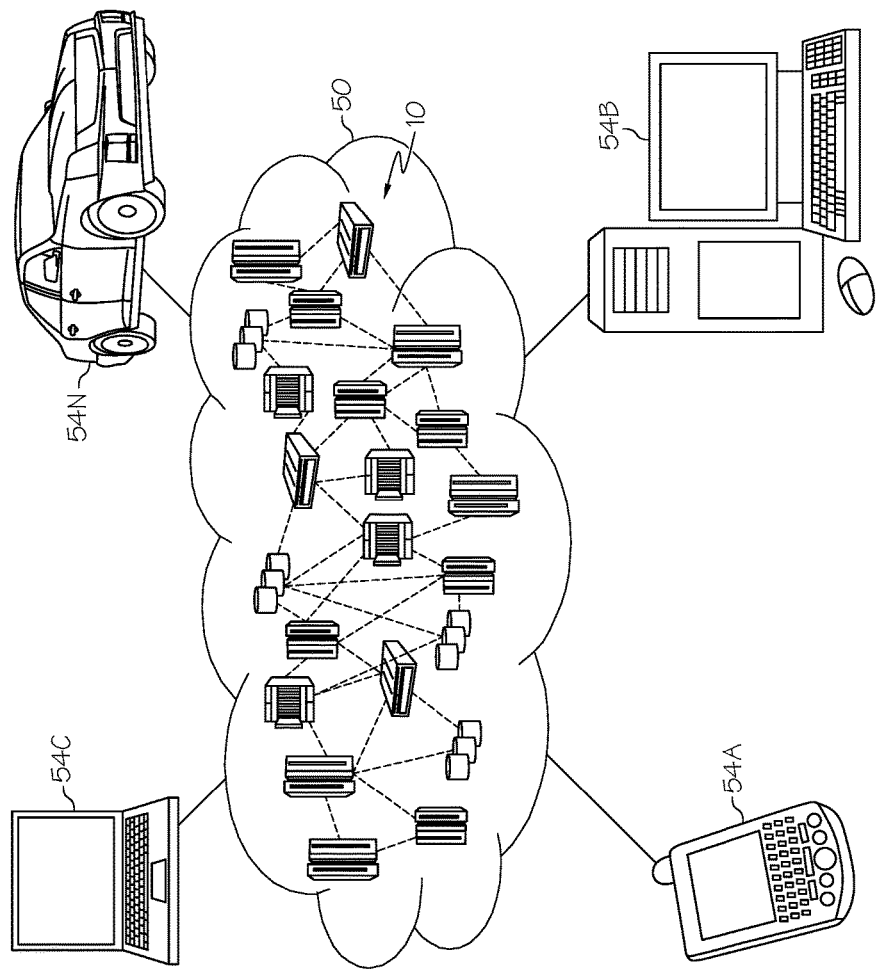
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
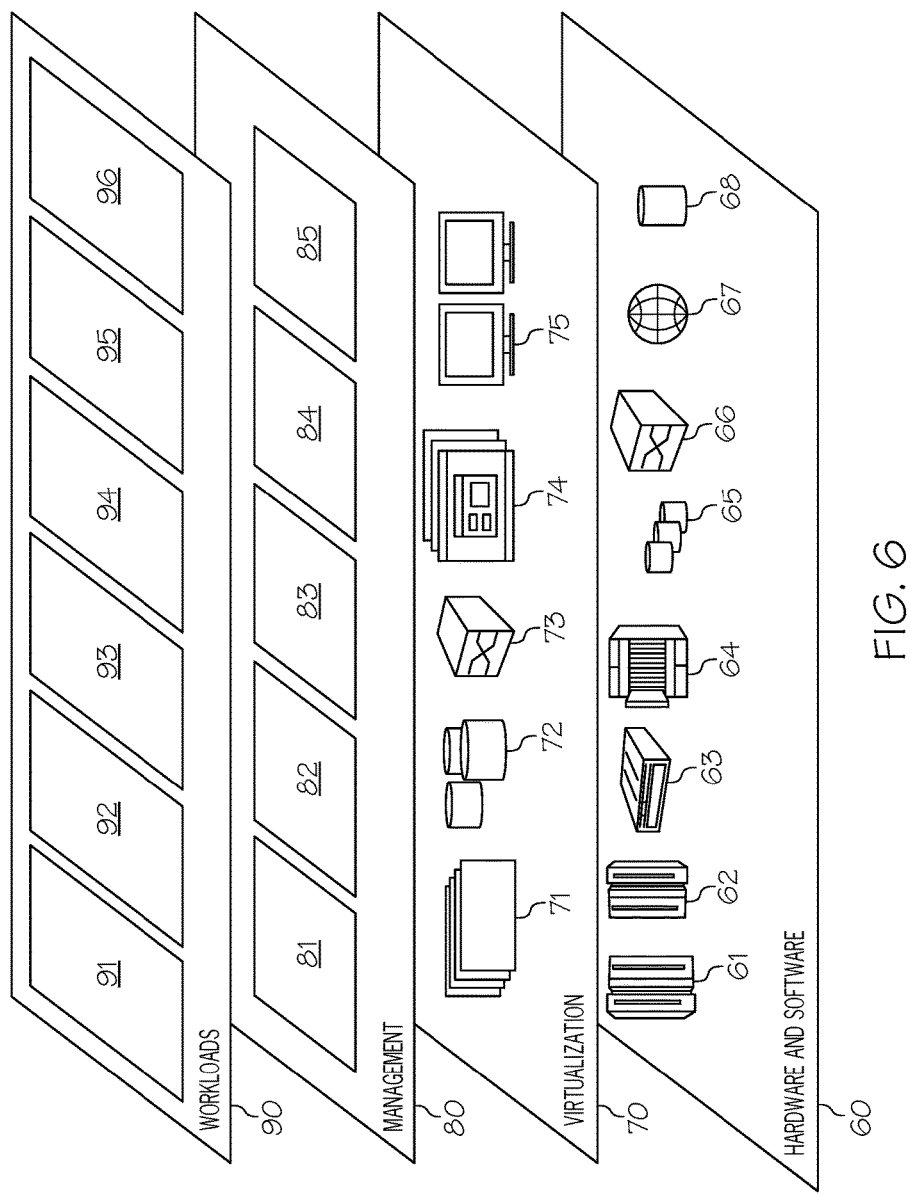
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device modification processing 96 to modify a device in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product comprising one or more computer readable storage mediums, and program instructions stored on at least one of the one or more computer readable storage mediums, the stored program instructions comprising:

program instructions to standardize a time series of data received from sensors that are monitoring a hardware device;

program instructions to determine a time delta that measures how long a disruption in the time series of data lingers after an event that is detected by the sensors;

program instructions to use the time delta to establish time ranges before, during and after each event;

program instructions to determine which events represented by the time series of data are significant by comparing means and trends of time sub-series corresponding to the time ranges before, during and after each event;

program instructions to generate a modified time series of data by reducing a number of significant events described by the time series of data by removing events that have tags not found associated with other events in the time series of data; and program instructions to modify the hardware device based on the modified time series of data.

2. The computer program product of claim 1, wherein a time-distance decay parameter D for determining how long the disruption lasts is derived by applying an autoregressive integrated moving average (ARIMA) algorithm to the modified time series of data.

3. The computer program product of claim 1, further comprising:
   program instructions to generate a modified time series data graph from the modified time series of data; and
   program instructions to apply a time series smoother to the modified time series data graph, wherein the time series smoother is derived by applying an autoregressive integrated moving average (ARIMA) algorithm to the time series data graph.

4. The computer program product of claim 1, wherein the hardware device is a manufacturing device, and wherein the computer program product further comprises:
   program instructions to generate a modified time series data graph from the modified time series of data, wherein a common feature in each event depicted in the modified time series graph causes the manufacturing device to introduce a defect into a physical product that is constructed by the manufacturing device.

5. The computer program product of claim 1, wherein the hardware device is a computer, and wherein the computer program product further comprises:
   program instructions to generate a modified time series data graph from the modified time series of data, wherein a common feature in each event depicted in the modified time series graph is a result of a hardware defect in the computer.

6. The computer program product of claim 1, wherein the hardware device is a computer, and wherein the computer program product further comprises:
   program instructions to generate a modified time series data graph from the modified time series of data, wherein a common feature in each event depicted in the modified time series graph is a result of a software defect in the computer.

7. The computer program product of claim 1, wherein the hardware device is a storage device, and wherein the computer program product further comprises:
   program instructions to generate a modified time series data graph from the modified time series of data, wherein a common feature in each event depicted in the modified time series graph is caused by a defect in a controller of the storage device.

8. The computer program product of claim 1, wherein the program instructions are provided as a service in a cloud environment.

9. The computer program product of claim 1, wherein the hardware device is a pressure vessel, wherein the time series of data is a first time series of data from the sensors that are monitoring the pressure vessel during a first time period, and wherein the stored program instructions further comprise:
   program instructions to compare the first time series of data to a second time series of data, wherein the second time series of data is from the sensors monitoring the pressure vessel during a second time period;
   program instructions to determine that the first time series of data and the second time series of data describe values of average pressures in the pressure vessel that match within a first statistical limit;
   program instructions to determine that the first time series of data and the second time series of data describe values of pressure increases in the pressure vessel that match within a second statistical limit; and
   program instructions to, in response to determining that the first time series of data and the second time series of data describe values of average pressures in the pressure vessel that match within a first statistical limit, and in response to determining that the first time series of data and the second time series of data describe values of pressure increases in the pressure vessel that match within a second statistical limit, determine that a cause of a spike in pressure in the pressure vessel is being caused by an event that is described by the first time series of data and the second time series of data.

10. The computer program product of claim 1, wherein the time series of data is a first time series of data from the sensors that are monitoring the hardware device during a first time period, and wherein the stored program instructions further comprise:
    program instructions to compare the first time series of data to a second time series of data and a third time series of data, wherein the second time series of data is from the sensors monitoring the hardware device during a second time period, and wherein the third time series of data is from the sensors monitoring the hardware device during a third time period;
    program instructions to determine that the first time series of data and the second time series of data share more event tags than the first time series of data and the third series of data; and
    program instructions to, in response to determining that the first time series of data and the second time series of data share more event tags than the first time series of data and the third series of data, determine that events described in shared event tags in the first time series of data and the second time series of data caused a fault in the hardware device, wherein the fault in the hardware device caused a disruption in the first time series of data.

11. The computer program product of claim 1, wherein the hardware device is a pressure vessel, and wherein the stored program instructions further comprise:
    program instructions to adjust a pressure relief valve on the pressure vessel based on the modified time series of data, wherein adjusting the pressure relief valve causes the pressure relief valve to open while pressure in the pressure vessel is increased after a spike in pressure in the pressure vessel.

12. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
    program instructions to standardize a time series of data received from sensors that are monitoring a hardware device;
    program instructions to determine a time delta that measures how long a disruption in the time series lingers after an event that is detected by the sensors;
    program instructions to use the time delta to establish time ranges before, during and after each event;
    program instructions to determine which events represented by the time series of data are significant by comparing means and trends of time sub-series corresponding to the time ranges before, during and after each event;
    program instructions to generate a modified time series of data by reducing a number of significant events described by the time series of data by removing events that have tags not found associated with other events in the time series of data; and program instructions to modify the hardware device based on the modified time series of data.

13. The computer system of claim 12, wherein a time-distance decay parameter D for determining how long the disruption lasts is derived by applying an autoregressive integrated moving average (ARIMA) algorithm to the modified time series of data.

14. The computer system of claim 12, further comprising:
program instructions to generate a modified time series data graph from the modified time series of data; and
program instructions to apply a time series smoother to the modified time series data graph, wherein the time series smoother is derived by applying an autoregressive integrated moving average (ARIMA) algorithm to the time series data graph.

15. The computer system of claim 12, wherein the hardware device is a manufacturing device, and wherein the computer system further comprises:
program instructions to generate a modified time series data graph from the modified time series of data, wherein a common feature in each event depicted in the modified time series graph causes the manufacturing device to introduce a defect into a physical product that is constructed by the manufacturing device.

16. The computer system of claim 12, wherein the hardware device is a storage device, and wherein the computer system further comprises:
program instructions to generate a modified time series data graph from the modified time series of data, wherein a common feature in each event depicted in the modified time series graph is caused by a defect in a controller of the storage device.

17. The computer system of claim 12, wherein the hardware device is a pressure vessel, wherein the time series of data is a first time series of data from the sensors that are monitoring the pressure vessel during a first time period, and wherein the stored program instructions further comprise:
program instructions to compare the first time series of data to a second time series of data, wherein the second time series of data is from the sensors monitoring the pressure vessel during a second time period;
program instructions to determine that the first time series of data and the second time series of data describe values of average pressures in the pressure vessel that match within a first statistical limit;
program instructions to determine that the first time series of data and the second time series of data describe values of pressure increases in the pressure vessel that match within a second statistical limit; and
program instructions to, in response to determining that the first time series of data and the second time series of data describe values of average pressures in the pressure vessel that match within a first statistical limit, and in response to determining that the first time series of data and the second time series of data describe values of pressure increases in the pressure vessel that match within a second statistical limit, determine that a cause of a spike in pressure in the pressure vessel is being caused by an event that is described by the first time series of data and the second time series of data.

18. The computer system of claim 12, wherein the time series of data is a first time series of data from the sensors that are monitoring the hardware device during a first time period, and wherein the stored program instructions further comprise:
program instructions to compare the first time series of data to a second time series of data and a third time series of data, wherein the second time series of data is from the sensors monitoring the hardware device during a second time period, and wherein the third time series of data is from the sensors monitoring the hardware device during a third time period;
program instructions to determine that the first time series of data and the second time series of data share more event tags than the first time series of data and the third series of data; and
program instructions to, in response to determining that the first time series of data and the second time series of data share more event tags than the first time series of data and the third series of data, determine that events described in shared event tags in the first time series of data and the second time series of data caused a fault in the hardware device, wherein the fault in the hardware device caused the disruption in the first time series of data.

19. The computer system of claim 12, wherein the hardware device is a pressure vessel, and wherein the stored program instructions further comprise:
program instructions to adjust a pressure relief valve on the pressure vessel based on the modified time series of data, wherein adjusting the pressure relief valve causes the pressure relief valve to open while pressure in the pressure vessel is increased after a spike in pressure in the pressure vessel.

\* \* \* \* \*